United States Patent

[11] 3,602,977

[72] Inventors Jean-Jacques Henri Oscar Huet
Jamioulx;
Henry Berthe Marie Joseph Massaux,
Stavelot, both of, Belgium
[21] Appl. No. 783,208
[22] Filed Dec. 12, 1968
[45] Patented Sept. 7, 1971
[73] Assignee Centre D'Etude De L'Energie Nucleaire,
C.E.N.
Brussels, Belgium
[32] Priority Jan. 24, 1968
[33] Belgium
[31] 709,814

[54] METHOD OF PRODUCTION OF AN ALLOY
2 Claims, 5 Drawing Figs.
[52] U.S. Cl. .................................................. 29/420,
29/423, 72/272
[51] Int. Cl. .................................................. B22f
[50] Field of Search .......................................... 18/12 DM,
14 M; 72/272; 29/420, 420.5, 423

[56] References Cited
UNITED STATES PATENTS
| | | | |
|---|---|---|---|
| 2,491,897 | 12/1949 | Lorant............................ | 72/272 |
| 2,630,623 | 3/1953 | Chisholm et al. .............. | 29/420 |
| 3,040,117 | 6/1962 | Jammet.......................... | 136/175 |
| 3,060,560 | 10/1962 | Biehl et al...................... | 29/420.5 |
| 3,150,773 | 9/1964 | Richter.......................... | 72/272 X |
| 3,177,573 | 4/1965 | Foerster........................ | 29/420 |

Primary Examiner—John F. Campbell
Assistant Examiner—D. C. Reiley
Attorney—Stevens, Davis, Miller & Mosher ABSTRACT: A method of production of an alloy wherein powders containing the constituentsthereofare intimately mixed, the mixture thus obtained being charged inside a casing, closedwith a cover recessed on the face facing the interior of the casing fitted with a bore, the assembly thus obtained being subjected to one compression operation, the bore in the cover being plugged, after which the compressed assembly is subjected to an extrusion operation, the outer layer being subsequently removed by a machining operation. The cover is produced from a metal which at extrusion temperature suffers less deformation than the mixture inside the casing.

METHOD OF PRODUCTION OF AN ALLOY

The present invention relates to a method of production of an alloy, according to which the powders of the constituents used for making up the alloy are intimately mixed, the mixture thus obtained is charged inside a casing, this casing is closed with a cover provided with a bore, the assembly thus obtained is subjected to one compression operation at least, the bore in the cover is closed with a plug and the compressed assembly is then subjected to an extrusion operation, after which the outer layer made up by the metal of the casing is removed from the extruded product.

A known method of this kind has for its object to produce a ferritic steel suitable for use as cladding material for fast reactors fuels and is particularly well suited for a carbide (UC or PuC) based fuel. The use of such ferritic steel solves the problem set by the increased brittleness of the usual cladding materials when irradiated with doses of $10^{23}$ nvt magnitude. Such ferritic steel is strengthened by the dispersion of a ceramic oxide in the matrix alloy.

However, this known process was beset with a number of difficulties in connection with the exhaust of the air when compressing the powders between the casing and the cover thereof as well as when extruding the assembly comprised of the casing, the contents thereof, i.e. the compressed powders and the cover closing the casing.

The invention has essentially for its object to overcome the disadvantages inherent to the known method and enables the operations of compression and extrusion to be carried out without difficulty and in an original manner. It should however be noted that the method according to the invention is not only an improvement of a known method of production of ferritic steel, but that it may have other uses, in particular the production of austenitic steel and of metal alloys generally, for example nickel based alloys.

For that purpose a component is used as a cover produced from a metal which at the extrusion temperature is subject to less deformation than the mixture charged inside the casing and heated to the same temperature.

For preference a component is used as a cover provided with a recess on the face facing the interior of the casing.

In a particular form of embodiment of the invention, a component is used as a cover, the recess thereof is deepest at the said bore.

In a preferred form of embodiment of the invention a component is used as a cover provided with a recess extending over the whole face facing the interior of the casing.

An essential condition in order that the known method, to which reference is made above, shall enable the production of a ferritic steel of excellent quality, wherein the iron, the other metal or metals of the alloy and the ceramic oxide or oxides are homogeneously distributed, is the intimate mixture of the raw materials and their presence right from the start in the shape of a powder with extremely small particles. A number of difficulties were encountered when attempting to meet this condition. The same difficulties are moreover encountered for each method of production of an alloy carried out in the manner hereinbefore described, in view of the fact that for each production of an alloy of excellent quality it is essential that the raw materials available in the shape of a powder shall be intimately mixed and shall be present right from the start in the shape of a powder with extremely small particles.

According to the invention, the difficulties encountered in this connection are met by the fact that the mixed powders are subjected to a ball milling inside a vibrated container.

In a form of embodiment applied for preference, a motion offset within its own plane is imparted to the container.

The invention relates not only to the method set forth above, but also to the alloy carried out according to such methods.

Other details and features of the invention shall become clear from the description of a method of production of an alloy and of the alloy thus obtained according to the invention, hereinafter given by way of non limiting example and with reference to the accompanying drawings.

In the different FIGS. the same reference numerals refer to identical components.

Figure 1:
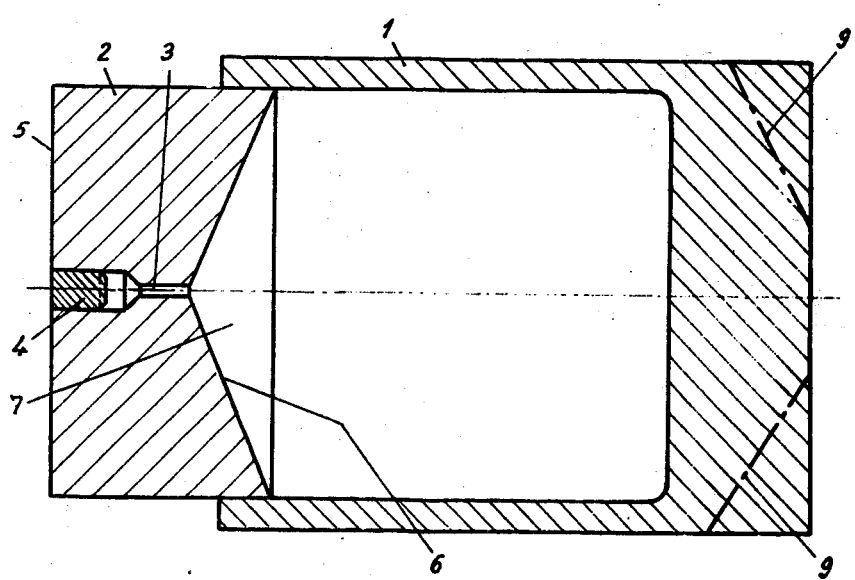
FIG. 1 shows a sectional view of an assembly comprising a casing, the cover thereof and the plug of the latter, used in a method of production of an alloy according to the invention.

The example hereinafter given refers more particularly to the production of a ferritic alloy able to be used as a cladding material for the fuels of fast reactors.

The raw materials used for production of such a steel are in powder form.

There are needed at least one powder containing iron, at least one powder comprising a ceramic oxide and, as the case may be, at least one metal powder used for imparting the particular characteristics to the steel.

The powder containing the iron may be iron powder, e.g. carbonyl-iron powder of technical purity, i.e. of 99.95 percent purity; this iron powder is e.g. of 2 to 5 $\mu$ fineness.

If the raw material containing the iron is an iron powder the other metal or metals used to produce with the iron the alloy steel must be added in powder form. Thus, for example, chromium is added in the shape of a powder the particles whereof are about 6 to 10 $\mu$ in size. Other metals which may be added in the shape of powders are particularly molybdenum, tungsten, niobium and vanadium. The powders of such metals may be added just as well to an iron powder as to a steel powder, e.g. an A.I.S.I. 410 steel powder.

The ferritic steel produced according to the method having to contain a ceramic oxide in the matrix alloy, recourse is also had to at least one raw material comprising a powder of a ceramic oxide e.g. $Al_2O_3$, $MgO$, $ZrO_2$, $TiO_2$ or $ZrSiO_4$ powder. Such powders have to be very fine, for preference below 0.5 $\mu$.

Raw materials not available in the shape of a sufficiently fine powder are first subjected to a treatment prior to being able of becoming added to the mixture, the preparation of which is described hereinafter. The preparation of the raw material comprises, e.g. a crushing in a ball mill.

It follows from the above that the raw materials for the production of ferritic steel comprise at least one iron containing powder, at least one ceramic oxide powder and, as the case may be, at least one metal powder. As raw materials may be used for example: 83 percent iron powder, 13 percent chromium powder, 2 percent molybdenum powder and 2 percent titanium oxide powder.

The molybdenum may be replaced or supplemented by 1 percent tungsten and 0.5 percent niobium. The titanium oxide may be replaced as a whole or in part by magnesium oxide, zirconium oxide, aluminum oxide or zirconium silicate.

The first operation comprises weighing the metal powders, i.e. the iron, chromium, if need be the molybdenum, tungsten and niobium powders.

These metal powders are subsequently intimately mixed, preferably for 20 minutes, in a V-mixer. As this device is well known in technology it is not described in the present patent application.

The ceramic oxide powders, i.e. of magnesium oxide, or titanium oxide, of zirconium oxide or of zirconium silicate are also weighed, and as required, subjected to drying.

The ceramic oxide powders are then mixed by hand with the metal powder originating from the V-mixer.

The mixture thus obtained is subjected to grinding, for preference in a ball mill. Tests have been carried out in this connection using a ball mill having a diameter of 230 mm. rotating at a speed of 60 to 80 r.p.m. This grinding operation is carried out for about 5 hours. In the case of applications on an industrial scale, larger sizes would be used and the speed would be adapted to such sizes.

The mixture originating from the grinder is subjected to a milling operation which has essentially for its object to crush the ceramic oxides which may agglomerate. Such milling is for preference carried out using a container having for example the shape of a tray. This tray is subjected to a vibration. Preference to a rotation offset within its own plane. This tray contains spheres which, in the course of the offset rotation of the tray move within the latter and crush the oxides. A speed of rotation of 200 r.p.m. and an eccentricity of 30 mm. yield satisfactory results. This milling is carried out for about 8 hours.

After this operation the raw materials are available in the shape of a homogeneous mixture. The ceramic oxide powder is available in the shape of very fine particles in-between the iron particles and those of the other metals.

This mixture of powders is charged in a mild steel case 1. This casing is closed with a cover 2 carried out in a heat resisting steel, for example 18/8 stainless steel. The mild steel is suitable for the case and the 18/8 stainless steel is suitable for the cover if the mixture of powders is to be used for the production of a ferritic steel. It will be well understood that the selection of the materials in which the case 1 and the cover 2 are carried out depends on the kind of alloy to be produced. It is essential that at the temperature at which the extrusion is carried out referred to hereinafter, the material of the cover 2 shall be less easily deformed than the metal material contained in the case 1.

At the center of the cover 2 is provided a bore 3 which passes right through the cover 2. On the outside of the cover 2 the bore 3 is wider and enables fitting a plug 4. The outside face 5 of the cover 2 is plane. The inner face 6 of the cover 2, i.e. the face directed towards the case is curved, so that the cover 2 is provided with a recess 7 directed towards the case. The recess 7 is deepest at the level of the bore 3.

The assembly comprising the casing 1, the mixture of powders contained inside such case and the cover 2, the bore 3 of which is not yet plugged with the plug 4 is subjected cold to a first compression operation. By means of this operation the cover 2 penetrates partially inside the casing 1. The pressure applied is such that the powders are subjected to a pressure of 3 kg./mm.$^2$ magnitude.

By means of this compression the air is expelled from the powders. The escape of air is favored by the recess 7 which acts as a funnel and leads the air exhausted from the powders towards the bore 3. Because of the particular shape of the face 6 of the cover, the powders positioned close to the cylindrical case wall are compressed before the powders positioned more in the center of the case shall be compressed. Thus a pressure gradient is built up inside the powder mass, such gradient directing the air from the cylindrical wall towards the center and from there to the funnel provided by the recess 7 and thus to the bore 3. A cover with a plane inner face would tend to apply a higher pressure towards the center and would thus impede the exhaust of the air.

After the cold compression, the plug 4 is positioned in the top portion of the cover 2. The assembly comprising the case 1, the contents thereof, and the cover 2 is then heated inside a muffle furnace up to a temperature of 700° C. magnitude. The time of heating is about one hour and such heating may be carried out in an inert atmosphere.

The assembly thus heated up is subsequently compressed at such temperature of 700° C. in the container of an extrusion press. Initially, the diameter of the casing 1 is slightly less than the inside diameter of the extrusion press container, but on account of the compression at a temperature of 700° C. the diameter of the case 1 expands. The pressure at which the said assembly is subjected to the temperature of 700° C. in the extrusion press container is 100 kg./mm.$^2$. By means of this operation the mixture of powders becomes a compact metallic mass. The air still escaping from the powders during the heating and the compression at the temperature of 700° C. is lead through the bore 3 to the plug 4 and is able to accumulate beneath such plug within the free space remaining between the face of the plug directed towards the case and the narrower portion of the bore.

During the compression at the temperature of 700° C. the cover 2 penetrates slightly further inside the case 1.

The following operation comprises welding the plug 4 inside the cover 2 and welding the latter inside the casing 1. The inside of the casing 1 wherein is positioned the metallic mass thus provides a hermetically sealed space.

The case is subsequently subjected to a new machining operation, in order that it may again easily fit inside the extrusion press container. Simultaneously the head of the case is given a conical shape along the lines 9 in order that the shape of such head shall be well fitted for turbulence free extrusion. The assembly comprising the casing, the contents thereof and the cover thereof is then heated again in salt baths for about 20 minutes to a temperature from 1,100 to 1,200° C. magnitude. Because of the fact that the plug 4 is welded on the cover 2 and that the cover 2 is welded on the case 1, the molten salts cannot enter the inside of the case wherein is positioned the metallic mass.

The assembly heated to the said temperature is subsequently subjected to the extrusion operation. It is particularly during such operation, that the shape of the cover and the fact that at such temperature the cover is less deformable than the material contained inside the case are of importance. This is diagrammatically illustrated by the FIGS. 2 to 5, wherein the extrusion equipment is diagrammatically referred to by the reference 10, the material of the casing in the course of transformation bearing the reference 11 and the material of the cover the reference 2. On the left of the line 12 are shown the respective positions prior to the extrusion. On the right of the same line are shown in the different Figures the respective positions after the extrusion.

In the four cases shown, the material 1 of the casing is positioned after the extrusion at the head and on the surface of the extrusion product. The FIGS. 2, 3 and 4 refer each time to operations wherein the cover has a face 6 directed towards the inside of the case which is plane. FIG. 5 relates to the case of the cover having the shape shown in FIG. 1.

Figure 2:
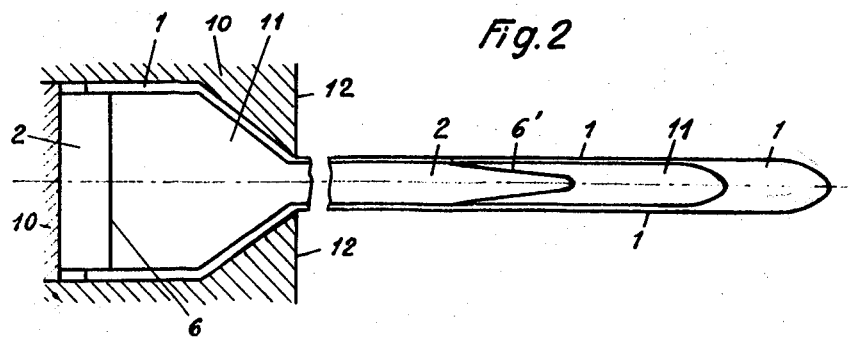
FIGS. 2 to 5 show diagrammatically the general run of the extrusion operation of a casing, the contents thereof and the cover thereof.

In the case of the FIG. 2, the resistance to deformation at the extrusion temperature is the same for the metal of the cover 2 and for the metal 11 inside the case. During the extrusion a deformation of the wall 6 providing the boundary between the metals 11 and 2 will occur having the general appearance of line 6'. The shape of such line is essentially determined by the friction of the casing against the inner walls of the container and of the die.

Figure 3:
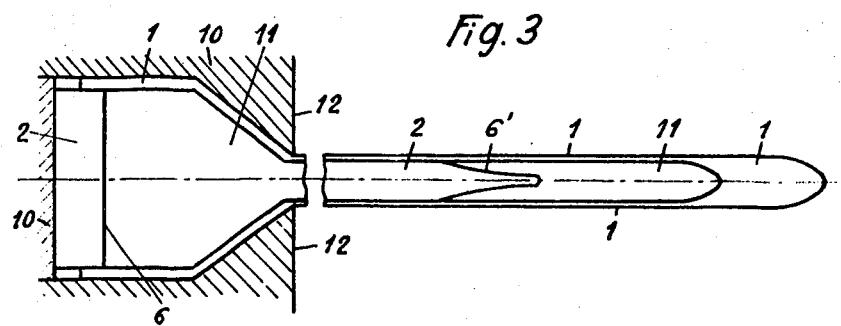

FIG. 3 relates to the case of a metal 11 inside the casing which deforms less easily than the metal of the cover 2. The deformation of the boundary face 6 will then be more marked, in view of the fact that the material 2 deforms more easily. As what it is wanted to achieve is an alloy of the metal 11, the operation according to FIG. 3 yields an extrusion product which is unusable over a considerable length on account of the core provided by the metal of the cover 2.

Figure 4:
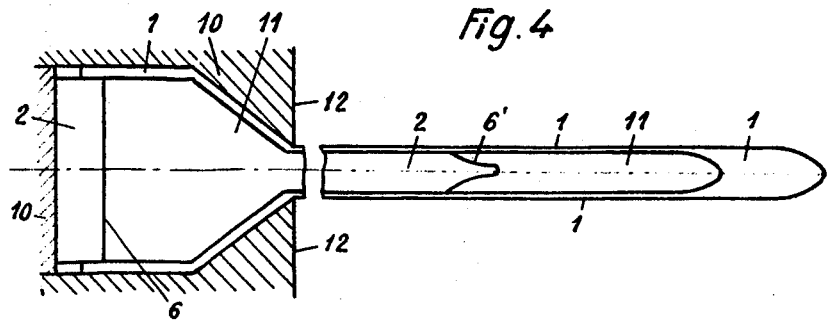
Figure 5:
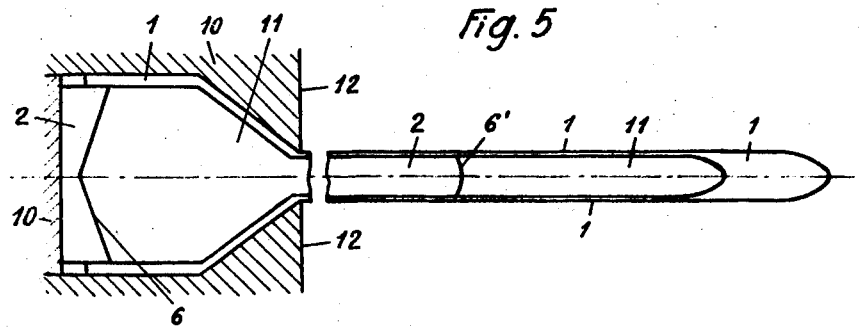

FIG. 4 relates to the case in which at the extrusion temperature the metal of the cover 2 deforms less easily than the metal 11 inside the casing. In that particular case, the face 6 is deformed in 6' but in a less marked manner than in the case of FIG. 3 and even than in the case of FIG. 2. The portion of the extrusion product unusable because of the core in the material of the cover 2 is therefore shorter.

FIG. 4 relates already to a method according to the invention, but a better implementation is that according to FIG. 5, which corresponds indeed to that according to FIG. 1. In the case of FIG. 5, the metal of the cover 2 deforms, always at the extrusion temperature, less easily than the metal 11 inside the casing and the face 6' in-between the metal of the cover and the metal 11 of the alloy provided after the extrusion, has the appearance of a plane surface, due to the fact that the cover 2 has a recess facing the inside of the case.

The alloy, therefore in the described example the ferritic steel, will be in the shape of a rod, the cross section of which is determined by the shape of the die. By means of a known appropriate technique, the alloy may be produced in the shape of a tube. Of the extrusion product only the portion, the core of which is made up by the alloy, is used and from such portion, the outer layer provided by the metal of the casing 1 is removed by machining for example.

It has been noted that the output of the method according to the invention is far superior to the output of the known method referred to in the introduction to the present patent application. The steel achieved according to the invention is highly homogeneous and of very fine grain. The helium released does not accumulate along the faces of the grains and does not therefore give rise to spots of lower resistance inside the steel.

It will be understood that the invention is in no way limited to the forms of embodiment hereinbefore described and that many changes may be introduced therein without departing from the scope of the present patent application.

Thus for instance the use of the method is in no way limited to the production of ferritic steels and this method may be extended to the production of austenitic steels and of metal alloys generally, for example of nickel alloys.

Evidently the appropriate powders have to be used for the production of the alloy considered.

The shape of the recess provided inside the cover has likewise to fit the kind of product to be produced by the extrusion.

The dimensions and rates mentioned above relate generally to laboratory tests. Applications on an industrial scale make use of equipment of appropriate dimensions in order to provide an economically paying production and the rates shall correspond to such dimensions.

We claim:

1. A method for the production of an alloy, comprising
mixing powders of the constituents used for making up the alloy,
charging the resulting mixture inside a metal casing,
closing said casing with a cover provided with a bore said cover being made from a metal which at the temperature of the extrusion is subject to less deformation than the mixture charged inside the casing,
forcing said cover into said casing in order to compress said mixture,
closing said bore in said cover with a plug, placing said closed casing in an extrusion chamber with the cover remote from the die opening of the chamber,
subjecting said closed casing to an extrusion operation in order to produce an extruded product, the outer layer of which is made up of the metal of the casing, and
removing said outer layer.

2. A method for the production of an alloy, comprising
mixing powders of the constituents used for making up the alloy,
charging the resulting mixture inside a container having the shape of a tray,
subjecting said container to a rotation offset within its own plane, charging said mixture from said container inside a metal casing,
closing said casing with a cover provided with a bore said cover being made from a metal which at the temperature of the extrusion is subject to less deformation than the mixture charged inside the casing,
forcing said cover into said casing in order to compress said mixture,
closing said bore in said cover with a plug,
placing the closed casing in an extrusion chamber with the cover remote from the die opening of the chamber,
subjecting said closed casing to an extrusion operation in order to produce an extruded product the outer layer of which is made up of the metal of the casing, and
removing said outer layer.